INVENTORS
JACK C. CAMHI
DONALD EUGENE HACKNEY
THOMAS GLENN LEWIS, JR.

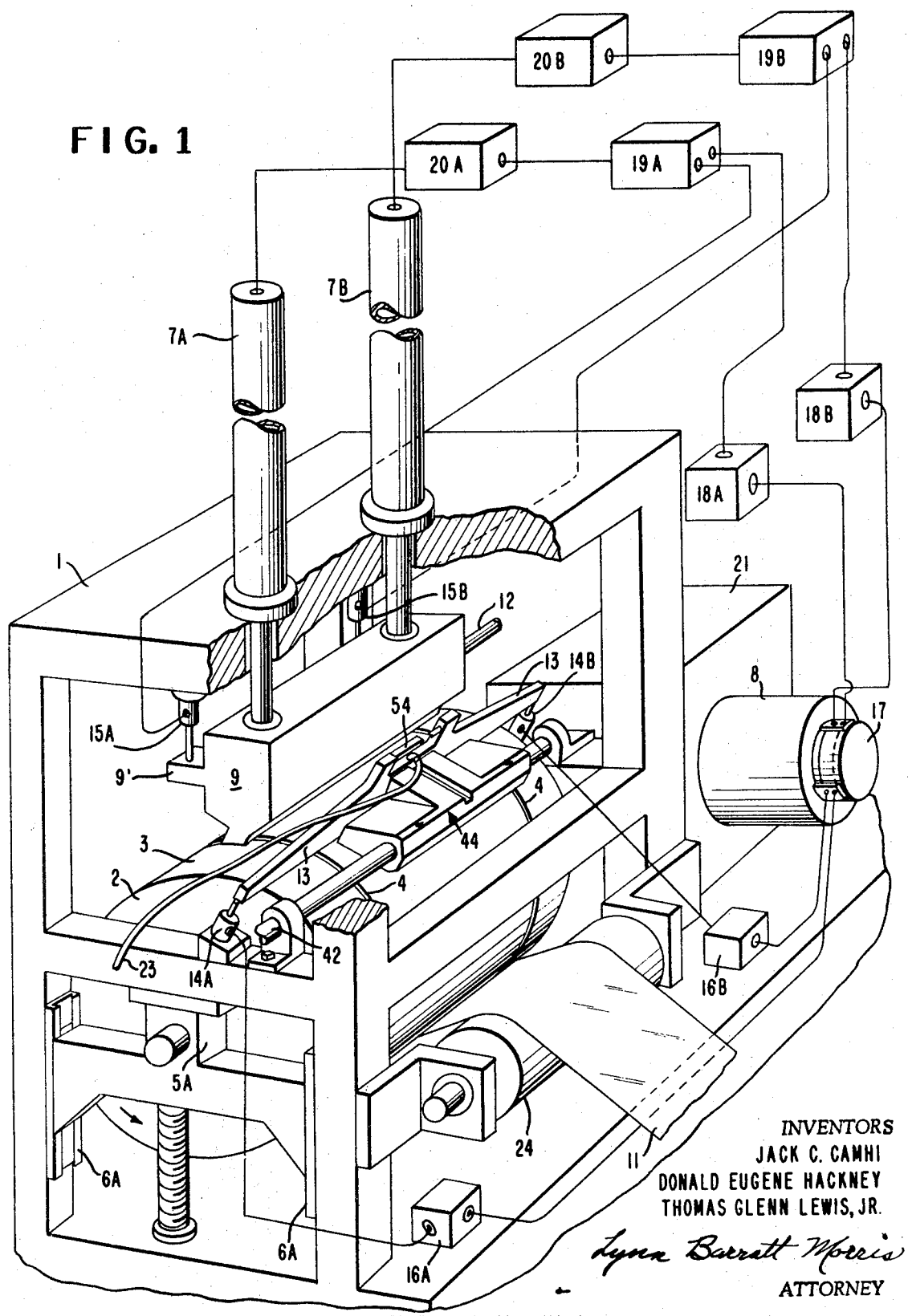

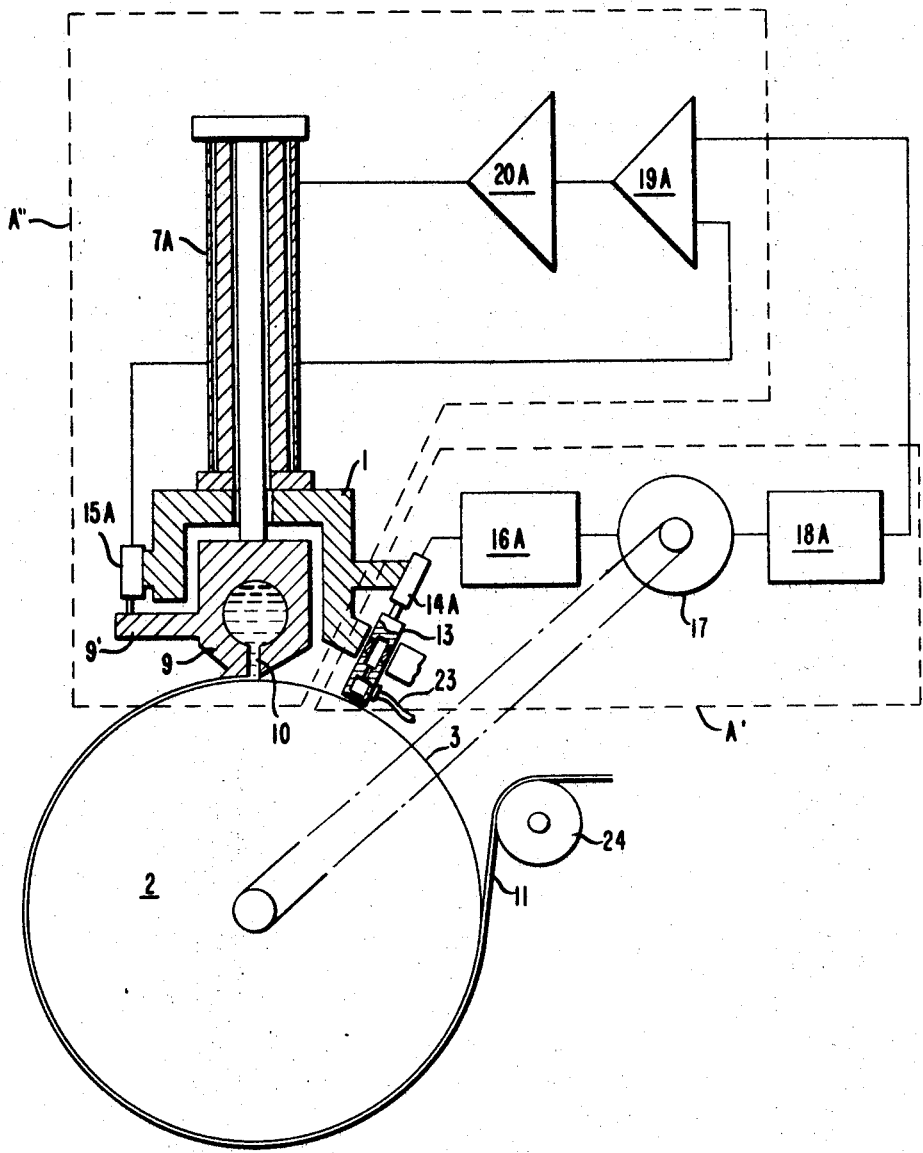

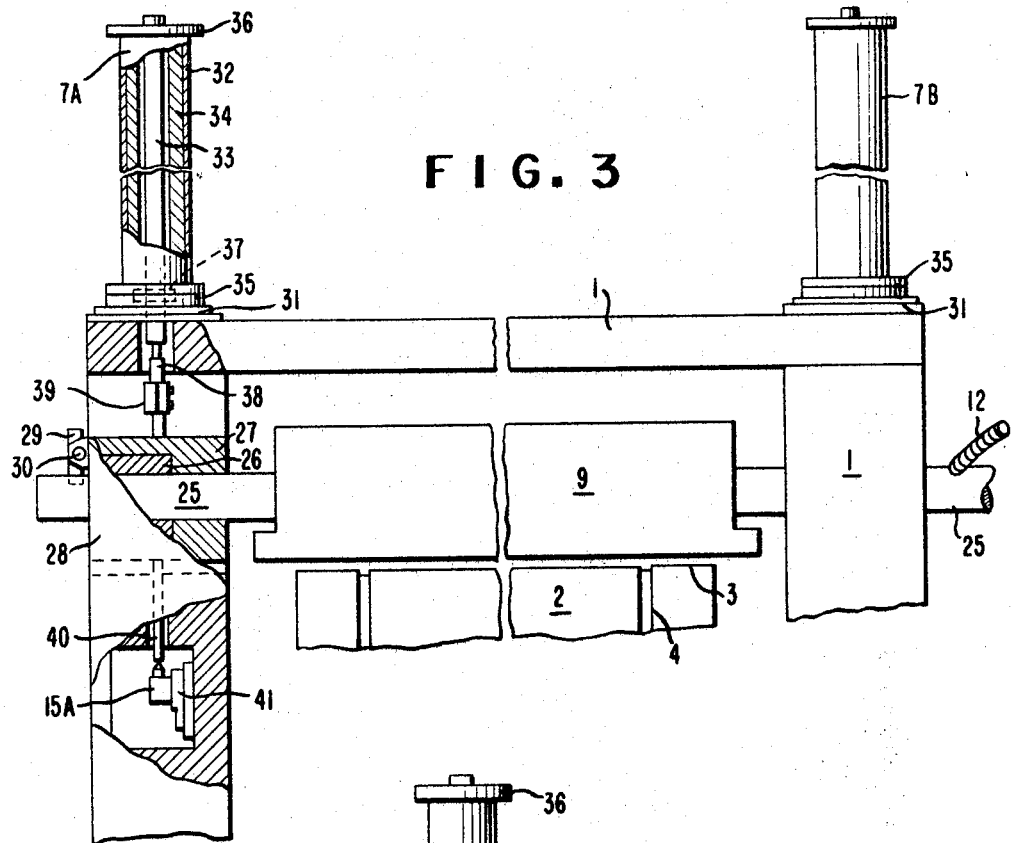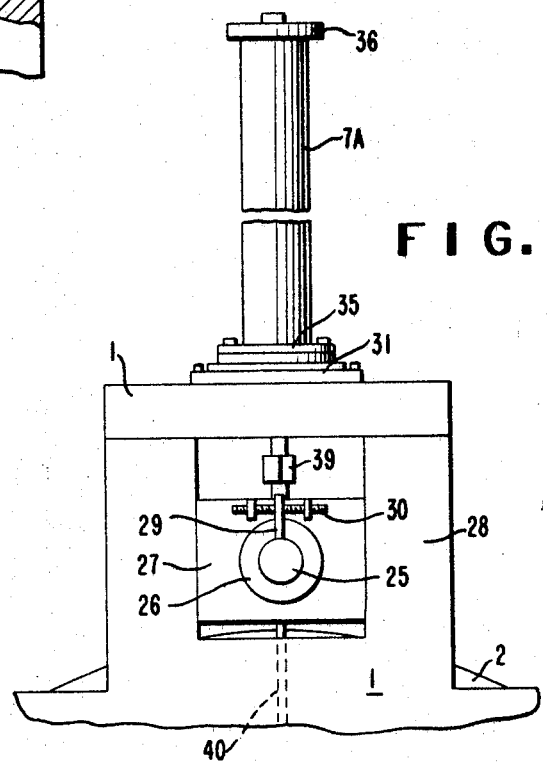

BY Lynn Barrett Morris
ATTORNEY

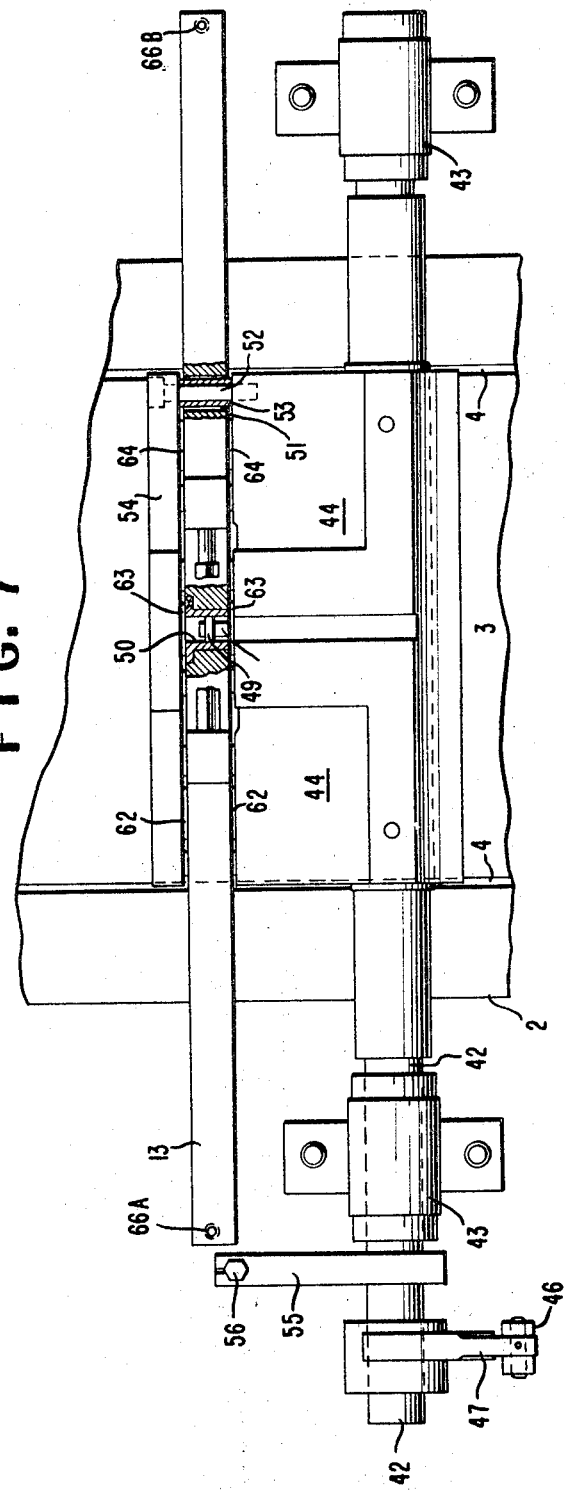
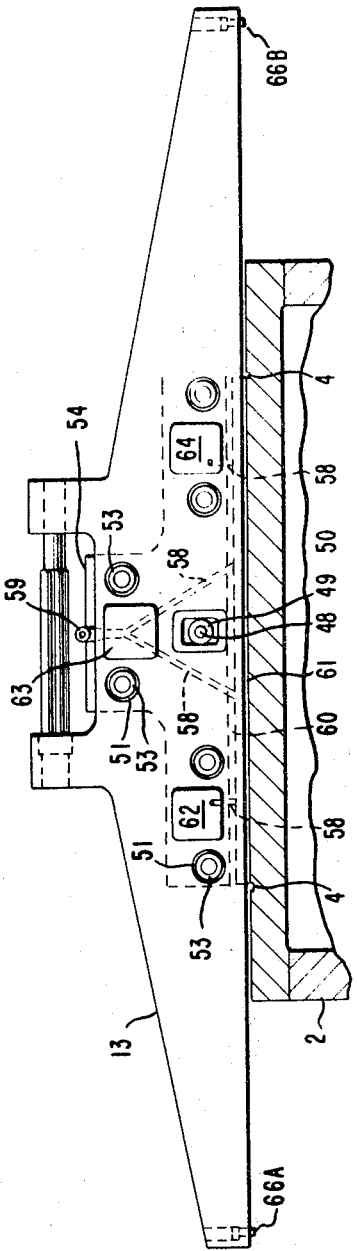

United States Patent Office 3,523,987
Patented Aug. 11, 1970

3,523,987
PROCESS FOR CASTING FILMS OF
UNIFORM THICKNESS
Jack C. Camhi, Springfield, Pa., and Donald E. Hackney, New Castle, and Thomas Glenn Lewis, Jr., Wilmington, Del., assignors to E. I. du Pont de Nemours and Company, Wilmington, Del., a corporation of Delaware
Original application Oct. 19, 1964, Ser. No. 404,698, now Patent No. 3,422,494, dated Jan. 22, 1969. Divided and this application Feb. 23, 1968, Ser. No. 734,180
Int. Cl. B29l 7/02; G01b 13/06
U.S. Cl. 264—39  2 Claims

ABSTRACT OF THE DISCLOSURE

Process for coating films of uniform thickness comprising continuously (1) determining eccentric deviations from a normal locus of the surface of a casting wheel across its width, (2) converting the deviations to signals as the surface rotates past a place, (3) transmitting the signals to a control device for a film casting hopper, and (4) adjusting the distance of the hopper from the surface to conform to average eccentric deviations. The process is useful for casting thermoplastic resins and super polymers.

---

This application is a division of prior application Ser. No. 404,698, filed Oct. 19, 1964, now Pat. No. 3,422,494 and entitled "Apparatus and Process for Forming Images."

This invention relates to a process for forming uniform layers of viscous materials and for recovering webs of uniform thickness. More particularly, the invention relates to a process for casting thermoplastic polymers and recovering polymer films of uniform thickness.

The invention will be illustrated and described in its preferred embodiment, the forming of a film by the extrusion of molten polymer onto a casting wheel having a temperature below the solidification point of the polymer. It should be understood that such illustration and description are only exemplary in that the invention may be adapted with little or no modification to other processes wherein viscous materials are formed or applied in thin layers, e.g., in processes for coating thin layers onto a web.

In the melt casting of films of synthetic, linear, polymeric material, e.g., polyethylene terephthalate, molten polymer is usually extruded from a hopper containing an orifice slot onto a moving casting surface or support. The support may be an endless belt conveyor, a cylindrical drum or a casting wheel which is provided with a smooth, highly polished surface and means for controlling the temperature of the surface. The molten polymer is deposited on the moving support and given sufficient residence time to solidify. The solid film is then removed as a continuous thin web or film which can be further processed according to the intended end use.

Apparatus for melt casting polyethylene terephthalate films and biaxially orienting them are described in U.S. Pats. 2,821,746 and 2,754,544. Molten polymer is extruded under force from an extrusion hopper whose orifice slot is located very close to the polished surface of a rotary wheel. The wheel surface is provided with spaced circumferential grooves such that a web is cast with continuous edge beads. After the web is solidified and stripped off the wheel, it is coated with a layer of a hydrophobic copolymer and biaxially oriented as described in Alles and Saner U.S. Pat. 2,627,088 and Alles 2,779,684. Suitable apparatus for orienting the webs are disclosed in U.S. Pat. 2,728,941. In that apparatus the edge beads provide means by which the web can be held or gripped and guided during laterally and longitudinally stretching to form thin film.

In the production of biaxially oriented films as just described, it becomes apparent that the physical properties and uniformity of film gauge (thickness) are largely dependent on the degree of orientation given to the film and on strict control of thickness during casting. The thickness of the cast web is a function of the gap-height or distance between the orifice and the surface of the casting wheel. The distance is usually set before start-up by means of adjustment screws, various stops or gauge blocks being used, and once the distance is established it remains fixed during the entire casting operation. In actual practice, however, maintenance of a constant distance is exceedingly difficult. Specifically, as the chilled surface of the wheel moves under the hopper orifice and receives the hot melt, it is subjected to sudden heating and undergoes localized expansion. As the surface carrying the polymer cools, it gradually tends to contract. Experience has shown that the stresses arising from the cyclic variations are of sufficient magnitude to actually distort the wheel and thus upset the gap-height setting. When these combine with the various fabrication inaccuracies of the wheel, the gap-height setting has been observed to vary as much as a few thousandths of an inch along the length of the casting surface and, with each change, a corresponding change in web thickness is produced.

In order to overcome the disadvantageous variations just described, various processes and apparatus have been proposed. One proposal for automatic adjustment involves adjusting the speed of the casting wheel in response to a web gauge control mechanism. A practical method and apparatus therefor is set forth in assignee's pending U.S. application, Fenley Ser. No. 368,813 filed May 20, 1964 (U.S. Pat. 3,347,960, Oct. 17, 1967). That method works very well when the imperfections in the casting wheel surface are the same along a line parallel to the axis of the wheel, i.e., a change in speed will produce the same result across the web. However, if the casting wheel "wobbles," changes in wheel speed cannot compensate for these imperfections as the hopper is rigidly mounted and cannot be tilted to maintain a uniform gap.

An object of this invention is to provide a new and improved process for continuously coating or casting webs into layers or films of uniform thickness.

Another object is to provide a web casting process that automatically compensates for eccentric surface variations in a casting wheel and produces webs of uniform surface characteristics.

A further object is to provide such process that will be dependable and produce uniform cast polymeric films over long periods of time.

Additional objects will be apparent from the following exemplary disclosures and detailed description of the invention.

Apparatus useful in accordance with this invention for applying thin, uniform layers of viscous material onto a casting surface and removing a uniform layer from the apparatus comprises, in combination:

(1) A stationary frame;
(2) A wheel journalled in the frame for rotation about an axis;
(3) A smooth, continuous, highly polished moving casting surface carried by the wheel as an integral part thereof or as a separate member.
(4) An extrusion hopper for the viscous material supported by said frame adjacent the casting surface, said hopper having a narrow orifice adjacent to and extending across said surface whereby a thin layer of said material can be applied to the casting surface;
(5) Adjustment means carried by the frame and attached to said hopper whereby the space between the lip of the hopper and the casting surface can be quickly adjusted in accordance with a signal received by said means to control the thickness of said layer;

(6) A floating sensing device adjacent and upstream of said hopper and supported by the frame, said device having a lateral fluid-ejecting housing extending across said casting surface, the sensing device being supported by the frame so that it is constrained in directional movements except those essentially normal to the casting surface and being constrained in the normal direction by a stream of gaseous fluid from the housing flowing between the bottom of the housing and the casting surface;

(7) Means carried by the sensing device for measuring minute deviations in the casting surface; and (8) Means for signaling deviations in the casting surface to adjustment means for the hopper so that the hopper can be raised or lowered in accordance with said variations.

The apparatus also has feedback sensing means for sensing and signaling the location of the hopper with regard to its distance above the moving surface onto which the coating of viscous material is to be applied; memory means for receiving and storing the signals from the sensing device and for transmitting the stored signal at a proper instant; and means for receiving the feedback signals from the hopper and the stored signals and for differentiating said signals to produce the final error-correcting signal that moves the hopper to insure uniform thickness of the coating as it is applied.

In the preferred embodiment of the invention, the casting surface carried by the wheel is integral with the wheel. In other embodiments the casting surface may be an endless belt made of highly polished metal or a polymeric plastic film of uniform thickness. The belt, however, may be of long length for continuous coating and pass around the wheel so that it is adequately supported prior to, during a passage under the sensing device and hopper, and after application of the layer. In this case, the variations in the surface of the wheel and the surfaces of the belt or continuous web are measured and taken into account by correcting the distance of the hopper above the casting surface at the point where the layer or coating is applied.

The process of this invention for casting viscous material into layers of uniform thickness in its broader aspects comprises:

(a) Continuously determining the average eccentric deviations from a concentric normal locus of the surface of a casting wheel throughout its width as the surface rotates past a particular place;

(b) Continuously converting the determined deviations to the form of signals as the surface rotates past said place;

(c) Continuously transmitting said signals to a control device for a layer-forming hopper; and (d) Continuously adjusting the distance of the hopper from said surface to conform to the average eccentric deviation so that the films will be of uniform thickness.

By the terms "hopper" or "extrusion hopper" it is intended to include all the various means for applying or forming a thin layer on a casting surface or smooth web to be coated wherein the thickness of the layer is primarily a function of the spacing between one lip of the hopper orifice and the casting/coating surface. With these means, one face of the thin layer is formed by the lip of the orifice and the other is formed by the casting/coating surface. An example of such means is a film extrusion die as disclosed in assignee's U.S. patent Bicher, 2,754,544 and another is conventional doctor blade coating device wherein the doctor blade spacing above the coated surface influences coating thickness.

The invention will now be described with reference to the accompanying drawings which constitute a part of the application and wherein the same reference numbers refer to the same parts throughout the drawings. In the drawings:

FIG. 1 is an isometric view of an apparatus useful for the process of the invention, with parts in broken section;

FIG. 2 is a partial side elevation with parts in section of the apparatus of FIG. 1;

FIG. 3 is a front elevation of a preferred hopper mounting means and actuation means for adjusting and maintaining the hopper at a desired spacing above a casting wheel;

FIG. 4 is a side elevation of the means of FIG. 3;

FIG. 6 is a partial front elevation of the pneumatic sensing device; and

FIG. 7 is a partial plan view of the pneumatic sensing device.

Figure 5:
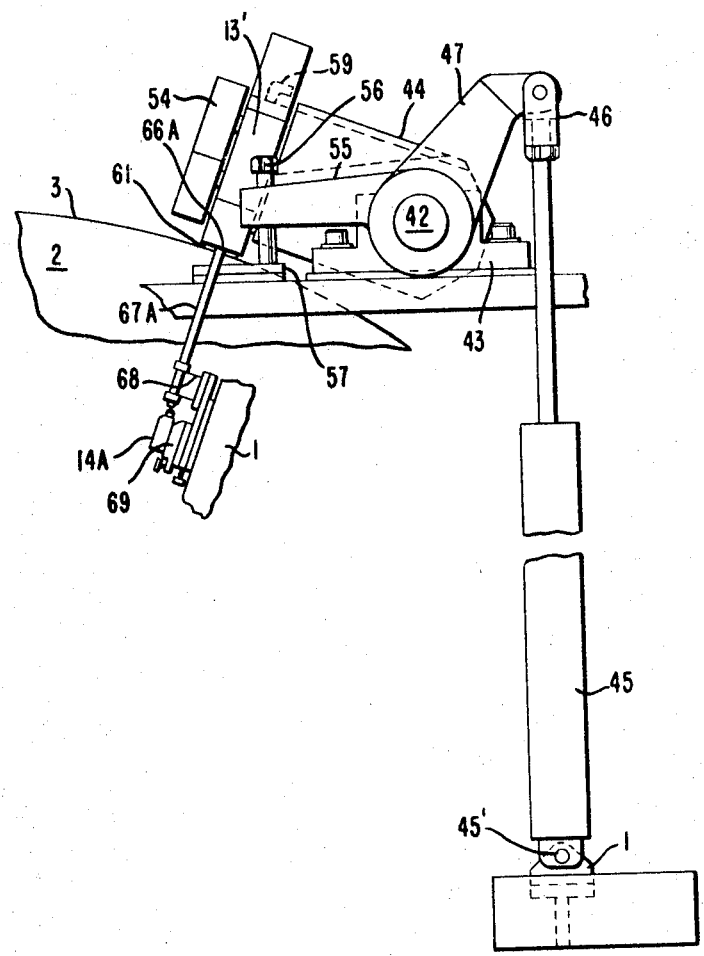
FIG. 5 is a side elevation of a preferred pneumatic sensing device with the related mechanism.

Reference is now made to FIG. 1 and FIG. 2 of the drawings which illustrate one practical embodiment of the invention. The basic and essential features of the invention are schematically depicted in these figures.

The exemplary casting machine that is shown in the drawings comprises a stationary rigid frame 1 composed of a table, base, uprights and cross members (not numbered), a rotary metal casting wheel 2 having means not shown for circulating a heat-exchange fluid therethrough to control the temperature of the surface and having a smooth, highly polished peripheral surface 3 including a pair of parallel circumferential bead grooves 4. The shaft ends of wheel 2 are rotatably journalled at their respective ends in movable bearing blocks 5a and 5b (not shown) that are slidably mounted in interfitting slides 6a and 6b (not shown) on the vertical uprights of the frame 1. Wheel 2 is rotatably driven (in a counterclockwise direction as indicated by arrow in FIG. 1) through a speed reducer 21 by a variable speed electric motor drive 8. The drive arrangement permits regulation of the speed of the surface 3 in accordance with or proportional to the rate of extrusion of viscous film-forming material. Directly above the wheel 2 is an extrusion hopper 9 having narrow transverse orifice slot 10 through which a relatively thin web 11 of viscous material, e.g., molten polymer is extruded onto surface 3, solidified thereon and removed at stripper roll 24 for further processing. A suitable hopper having lateral grooves near the ends of the transverse slot orifice to correspond to grooves 4 in the wheel is described in Bicher U.S. Pat. 2,754,544. Molten polymer, e.g. polyethylene terephthalate, is fed under pressure into hopper 9 through inlet and flexible hose 12 from a suitable source.

Adjacent and upstream of hopper 9 is a sensing device 13 (sensor) for determining deviations in the surface of the wheel as it rotates. This device has slender lateral fluid-ejecting housing member 13' that floats above surface 3 on a thin layer of predetermined thickness of gaseous fluid, e.g., that is supplied under pressure through tube 23 from a suitable source. At the ends of the fluid ejecting housing displacement detectors 14a and 14b are mounted on frame 1. Suitable detectors are commercially available as differential transformers whose movable core portions operatively engage the lateral housing 13'. A description of such differential transformers may be found in U.S. Pats. 2,050,629 and 2,427,866. A second set of such detectors 15a and 15b are attached to the table of frame 1, the movable cores of the detectors engaging lateral arms 9' near the lateral ends of hopper 9 to monitor the position of the hopper with respect to the surface of the wheel.

Any change in position from a pre-set point by the sensing device 13 or the hopper 9 relative to the moving surface 3, shifts the core in a detector and thus generates a varying voltage signal. The magnitude of the signal is a function of the amount of movement that occurs.

Signals generated by detectors 14a and 14b, for example, can be transmitted to conventional electronic analog to digital converters 16a and 16b and transformed into digital form for temporary storage on a magnetic memory drum 17. The analog to digital converters can be a "ripple down logic," forced balance type utilizing the principle of nodal currents. Suitable memory drums are available commercially and are driven by the motor drive 8 in synchronism with driven wheel 2. Digital to analog converters 18a and 18b, which can be of the forced balance type utilizing the principle of nodal currents, are connected to the read-out side of drum 17 and received the delayed signals which then are reconverted to their original analog form. The signals should be delayed to compensate for the distance between the sensing device and the hopper, as will be explained. These signals are then fed together with the signals from detectors 15a and 15b into differential amplifiers 19a and 19b; that is, detectors 14a and 15a feed signals into amplifier 19a and detectors 14b and 15b feed into amplifier 19b. At this point the signals are differentiated and a resultant error correction signal is transmitted to variable power amplifiers 20a and 20b. The differential amplifiers 19a and 19b consist essentialy of two amplifier sections, the first being a "chopper" amplifier which performs the required differential action and the second a "unity gain" buffer amplifier. Depending on the direction of the corrective movement required, the correction signals may either increase or decrease the output of the power amplifiers 20a and 20b. The power amplifiers are commercially available proportional amplifiers. The power levels of amplifiers 20a and 20b are adjusted at start up to a level which places the actuators 7a and 7b at a midrange setting. Accordingly, a minimum error signal reduces the power level to a particular actuator proportionally. This causes the actuator to shorten and thus raise hopper 9. Conversely, a maximum error correction signal adds to the pre-set power level, elongates the actuator and moves hopper 9 downward.

It should be noted that actuators 7a and 7b are designed to function independently of each other. Hence, at any given instant, actuator 7a may be responsive to a maximum error correction signal while 7b is responsive to a minimum correction. Separation of signals is achieved by closed servo-loops A and B wherein actuator 7a is part of loop A and actuator 7b part of loop B. Since both loops are structurally identical and functionally parallel, only loop A is shown in FIG. 2 and is described in detail. It is understood, of course, that the following discussion applies equally to loop B. Referring now to FIG. 2, loop A is actually composed of a command sub-loop A' and control sub-loop A''. Command sub-loop A' includes the sensor 13, detector 14a, converter 16a, magnetic drum 17 and converter 18a; while control sub-loop A'' includes hopper 9, actuator 7a, power amplifier 20a, differential amplifier 19a and feedback detector 15a. Both sub-loops, of course, include the casting wheel 2. Thus, error signals generated in command sub-loop A' are differentiated with feedback signals of sub-loop A'' by differential amplifier 19a. The resultant error correction signal from amplifier 19a is then superimposed on the power supply 20a which energizes actuator 7a. Error and feedback signals within sub-loops B' and B'' are processed similarly and error corrections directed into actuator 7b. From the foregoing, it is seen that closed servo-loops A and B function in electrically indepedent fashion; however, both loops are mechanically connected by hopper 9, sensor 13, drum 17 and wheel 2, hence function conjointly. This is essential for successful operation of the system as changes in surface can be detected; for example, 20° arc-length prior to the time the changes reach the hopper 9. Consequently, error command signals in either of the servo-loops A and B are stored temporarily on magnetic drum 17 until the changes in surface arrive at hopper 9. At that time, the signals are read out. differentiated and corrective adjustment effected.

As described in U.S. patent Bicher, 2,821,746, the casting machine can have a bead-shaping roll (not shown) located adjacent the casting wheel 2 beyond the point of extrusion. The wheel can be provided with means for circulating a heat-exchange fluid therethrough to maintain the temperature of the surface 3 of the wheel below the melting point of the polymer, means for raising and lowering the casting wheel, and driving means for these mechanisms can be provided. As suitable means are known and are not necessary for an understanding of the present invention, they are not described further.

Referring to FIGS. 3 and 4, the respective ends of hopper 9 are provided with lateral stubshafts 25 that are rotatably interfitted with collars 26, which in turn are rigidly mounted in recesses in slide blocks 27a and 27b. These slide blocks are slideably suspended between side frames 28 that are part of the main frame 1. For simplicity, these mounting means which permit the hopper to be moved toward or away from the casting surface 3, were not illustrated in FIG. 1.

As shown in FIGS. 3 and 4, suitable adjusting means can be provided so that hopper 9 can be rotated slightly with respect to the frame 1 to tilt the orifice slot to an optimum angle for better control of web formation. For example, an extension 29 that is keyed to shaft 25 to coact with tilt-adjusting screws 30 which are threadably engaged on slide block 27. There would be one adjusting screw on each side of the extension; thus by suitable screw adjustment the hopper could be tilted.

FIGS. 3 and 4 show a detail of one of the magnetostrictive actuators 7a. Since both actuators are structurally and functionally identical, only actuator 7a will be described.

Actuator 7a is mounted on platform 31 which is fastened to the table of frame 1. The actuator 7a as shown in FIG. 3 has an external casing 32, an inner rod 33 and an electrical copper wire coil 34 that is interposed therebetween for generating a magnetic field. Casting 32 is made of a suitable material having a negative magnetostrictive coefficient, preferably pure nickel, which under the influence of a magnetic field contacts. The casing 32 is fitted at the bottom with a base 35 which is fastened by suitable fasteners to platform 31 and at the top with a cap 36. Rod 33 of vanadium permendur material which has a positive magnetostrictive coefficient, is rigidly connected at the top of casing 32 to cap 36 so that when both components are under the influence of the magnetic field, the contraction of casing 32 adds to the elongation of rod 33. Rod 33 protrudes through an aperture in base 35 and is suspended in a segmented flexure disk 37. Disk 37 which is suitably clamped to base 35 is constructed of a plurality of radial segments which function by holding rod 33 in rigid alignment without restricting its up and down movement. The external end of rod 33 protrudes through appropriate clearance holes in platform 31 and frame 1, and is threadedly connected to the upper half of a split coupler member 38 whose lower half is threadedly engaged in slide block 27a. The spherical ends of both halves of the coupler member 38 are brought together and held by a clamp 39. Directly below and threadably fastened to the bottom face of slide block 27a is an extension rod 40. This rod 40 operatively abuts with the movable core of feedback detector 15a. The body of the detector 15a is mounted on a micro-adjustment slide 41 which, in turn, is secured to a crossbeam of the frame 1. Various screws on the slide 41 are present for coarse and fine adjustments. These are used during startup operations for setting the signal output at the midrange point. For the sake of clearness and simplicity, the details of these means are not shown.

To the right of hopper 9 (as viewed in FIG. 1 and FIG. 2) is the sensor 13. As shown in FIG. 5, the sensor 13 is couched in a lifting mechanism which comprises a pivotal shaft 42 that is journalled at each end in conventional type bearings 43, a housing 44 that carries sensor 13 and a pneumatically powered cylinder 45 for raising the above mechanism. Cylinder 45 is pivotally mounted on lugs 45' on frame 1 and connects with shaft 42 through connector 46 that is affixed to its rod end and a lifting lever 47.

The housing 44 is symmetrically positioned over the wheel 2 and is tightly pinned to the shaft 42. Stub shaft 48 (as shown in FIG. 7) is anchored at one end to housing 44 and at the other end rotatably supports antifriction bearing 49. This bearing 49 communicates with sensor 13 by slidably interfitting within an insert 50. The aperture of insert 50 is rectangular-shaped and is in close fitting relationship with bearing 49; hence, sensor 13 is free to move up and down and pivot about the shaft 48 but cannot shift laterally in either direction. Sensor 13 is provided with six oversize clearance holes 51 through which bolts 52 pass and threadably engage housing 44. Bolts 52 coact with spacers 53 which are of predetermined length and fixedly hold a flat back up plate 54. Back up plate 54 is set off from housing 44 so that a slot is formed in which sensor 13 is confined. Stop lever 55, adjustment screw 56, and stop plate 57 are adjustment means for setting sensor 13 perpendicular to surface 3.

Sensor 13 is modified internally by branched passages 58 which communicate externally with inlet fitting 59 and internally with shallow cavities 60. The latter are provided with pads 61, 62, 63 and 64 that are composed of a porous material such as sintered graphite. Pad 61 is contiguous to surface 3 of wheel 2, while pads 62, 63 and 64 are on the front and back vertical surfaces of sensor 13. Instrument quality air from a suitable supply (not shown is conveyed to the sensor 13 by means of a flexible tube 23 into the passages 58. The air pressure is regulated to floatably support sensor 13 on a thin (approx. .0002 inch) layer of air above the surface 3 and between the guiding surfaces that are parallel to the air stream that is normal to the surface of the wheel. When so supported, sensor 13 is completely free and clear of any rigid constraint and is highly sensitive to any deviations in the surface of the wheel. Such deviations are manifested by movement which is transmitted to either end of the sensor 13 through adjustable pins 66a and 66b, rod extensions 67a and 67b, and into detectors 14a and 14b.

As best shown in FIG. 5, rod extension 67a is suspended on miniature flexures 68 and abuts with the detector 14a core. Detector 14a is likewise mounted on a micro-adjustment slide 69 which is fixedly attached to frame 1. Slide 69 is also provided with adjustment screws for setting the initial midrange signal output.

In operation, the sensor 13 can track the casting wheel surface 3 at approximately 20 degrees in advance of the hopper orifice 10. Differential transformers 14a and 14b on each end of the sensor pick up the motion of the sensor as it rides the surface of the casting wheel. Each differential transformer records the amount of motion as a proportional electrical signal on a memory drum 17. When the drum, which is synchronized with wheel rotation, has rotated 20 degrees, the signal is read out, compared and amplified to shorten or lengthen the magnetostrictive rods on each end of the hopper to control the hopper lip to wheel spacing. The magnetostrictive actuators because of their mechanical simplicity, ruggedness, and accurate dimensional control are preferred actuators.

In operating the apparatus, it should be noted that the thinner the layer of air under sensor 13, the greater is its sensitivity. For example, air pressure is adjusted to establish a .0002 inch layer. Before commencing with the polymer extrusion, various adjustments are made. The gap height between orifice slot lip 10 and surface 3 is set by manual adjustment in accordance with the desired web gauge. The various electrical components are now energized. The direct current voltage outputs from power amplifiers 20a and 20b are adjusted to elongate actuators 7a and 7b to their midrange points. This is followed by coarse and fine adjustment of the screws on slides 41 which places the cores of detectors 15a and 15b at a midrange signal output setting. A similar adjustment is made to detectors 14a and 14b. At this point, the wheel 2 is rotatably driven and molten polymer extruded through the orifice slot 10. As the nascent web 11 moves away from the casting zone and partly solidifies, it can pass under a coacting roll whereby edge beads are re-shaped.

The web 11 carried by the wheel surface 3 cools further and adequately hardens as it approaches stripper roll 24. There the web is diverted and can be subjected to the action of other processing apparatus such as that shown in U.S. Pat. 2,728,941.

When thermal conditions attain a steady state, final adjustments are made to the detectors 14a, 14b, 15a and 15b. In the event a large thermal drift has occurred that exceeds the range of detectors 14a, 14b and 15a, 15b, manual adjustment can be made to bring the system back to the midrange position.

From this point on, automatic gauge control takes over. Sensor 13 responds to various changes in the surface 3 by slight up and down movements that are transmitted to detectors 14a and 14b and transformed into electrical signals. As previously mentioned, these signals are in the command loops A' and B' and therefore are delayed until that portion of surface 3 arrives under orifice slot 10. It has been observed that at a given instant the portion of surface 3 under sensor 13 contains irregularities composed of peaks and valleys. Instead of responding by sudden sporadic hunting or spasmodic variations, the sensor 13, surprisingly, virtually instantaneously assumes an average position between the extreme positions. This is accomplished by providing the extremely thin layer of gas or gases to support the sensor 13. Thus, the signals transmitted by detectors 14a and 14b are average errors across surface 3. In actual practice, this produces gradual transitions and a highly uniform gauge web.

The following example is typical of the machine operating parameters. In the production of a polyester web 0.075 inch in thickness, the surface speed of the casting wheel is adjusted for travel approximately 25% faster than the rate of extrusion. Accordingly, gap height is adjusted at .110 inch to account for the web draw-down that occurs. Air pressure to the pneumatic sensor is regulated at 70 p.s.i.g. Voltage level on the magnetostrictive actuators is maintained somewhere between 0 and 90 volts D.C. so that the movable rods are elongated .0015 inch.

To illustrate the significant improvement is web gauge quality, the above mentioned web was produced first without the benefit of the gauge control mechanism and then under the above described conditions. Comparative tests of both webs show the gauge control mechanism is capable of producing up to 80 percent more uniform product.

The various structural parts of the apparatus described can be made of conventional materials of construction. The frame can be made of mechanite cast iron for strength, rigidity and resistance to deformation at elevated temperatures. The surfaces of the various parts of the extrusion hopper or die and casting wheel, i.e., the surfaces which contact the molten material, should be carefully machined and highly polished. These parts should be made of metal, e.g., corrosion-resistant steel, stainless steel, alloy steel, etc. which has been hardened.

Many modifications within the scope of the present invention will be obvious to those skilled in the art. The smooth running surface instead of being the surface of a casting wheel could be the surface of an endless, running casting belt or apron of stainless steel or similar material. In environments where coating thickness uniformity is difficult to obtain due to the contour variations existing in the web of material to be coated as it passes over the coating roller, the subject invention may be used, e.g., coating of webs of film, foils, textile fibers etc.

The invention is particularly useful in casting of thermoplastic film. Some of the film for which the invention is useful are polyethylene terephthalate, such as described in U.S. Pat. 2,465,319, resins and superpolymers, e.g., nylon, polyethylene, polypropylene, polystyrene, polyvinyl halides, polyvinyl acetate, rubber hydrochloride; cellulose derivatives, e.g., cellulose acetate, cellulose formate, cellulose propionate, celluose acetate butyrate; methy, ethyl, butyl, benzyl, allyl and crotyl ethers of cellulose; polyesters from glycols and aliphatic dibasic acids, polyesteramides, etc. The films so extruded, moreover especially when they are used as photographic film base, may be coated with various materials including the vinylidene chloride copolymers described in Alles et al. U.S. Pat. 2,491,023, to form sublayers.

The invention has many advantages, several of which are set forth below.

The novel casting machine affords faster start-up, less maintenance and prolonged trouble free production of consistently uniform quality product. The adjustably controlled hopper features are simple, rugged, and highly sensitive over a wide range of operating parameters. Due to the gauge control sensitivity, the various casting machine components can be fabricated to less stringent tolerances thus effecting substantial savings in capital investment. The pneumatic sensor permits continuous monitoring of the actual highly finished casting surface and offers the additional advantage of integrating a plurality of varying irregularities into a single error signal without injuring the surface of the casting wheel or marring the coating or film.

Consistently high quality web product can be produced even after a casting wheel surface may acquire a warped surface with numerous deviations. The gauge control mechanism can be easily adjusted to operate with a rapid response over a wide range of web casting parameters fully automatically and with the same sensitivity. The machine automatically compensates for random variations in the casting surface that cannot be compensated for by changes in the speed at which the casting surface moves past the hopper.

An additional advantage of the novel casting process of this invention is that one can readily produce uniform gauge in a cast film by following the wheel surface; i.e., by moving the hopper up and down in synchronization with the eccentricities of the wheel surface and providing for tilting the hopper if there is a wobble in the casting wheel, thus maintaining a constant and parallel gap.

We claim:
1. A process for casting viscous material into films of uniform thickness which comprises:
 (a) continuously determining the average eccentric deviations from a concentric normal locus of the surface of a casting wheel throughout its width as the surface rotates past a particular place which is up stream of the point where the film is cast onto the surface;
 (b) continuously converting the determined deviations to the form of signals as the surface rotates past said place;
 (c) continuously transmitting said signals to a control device for a film casting hopper; and
 (d) continuously adjusting the distance of the hopper from said surface to conform to the average eccentric deviations so that the films will be of uniform thickness as they are cast onto said surface.

2. A process according to claim 1 wherein the average deviations are determined by providing a thin narrow stream of gaseous fluid of constant thickness on said surface and measuring the movement normal to the casting surface of the means for forming the stream.

References Cited
UNITED STATES PATENTS

| | | | |
|---|---|---|---|
| 3,088,061 | 4/1963 | Smith | 18—2 |
| 3,122,783 | 3/1964 | Jolliffe et al. | 18—2 |
| 3,135,018 | 6/1964 | Smith | 18—2 |
| 3,212,127 | 10/1965 | Flook et al. | 18—2 |
| 3,347,960 | 10/1967 | Fenley | 18—2 |

ROBERT F. WHITE, Primary Examiner

J. R. THURLOW, Assistant Examiner

U.S. Cl. X.R.

18—2; 264—40, 216, 349